March 8, 1932. C. T. THORSSELL 1,848,756
PROCESS FOR THE PRODUCTION OF POTASSIUM NITRATE AND SODIUM CARBONATE
Filed July 3, 1930
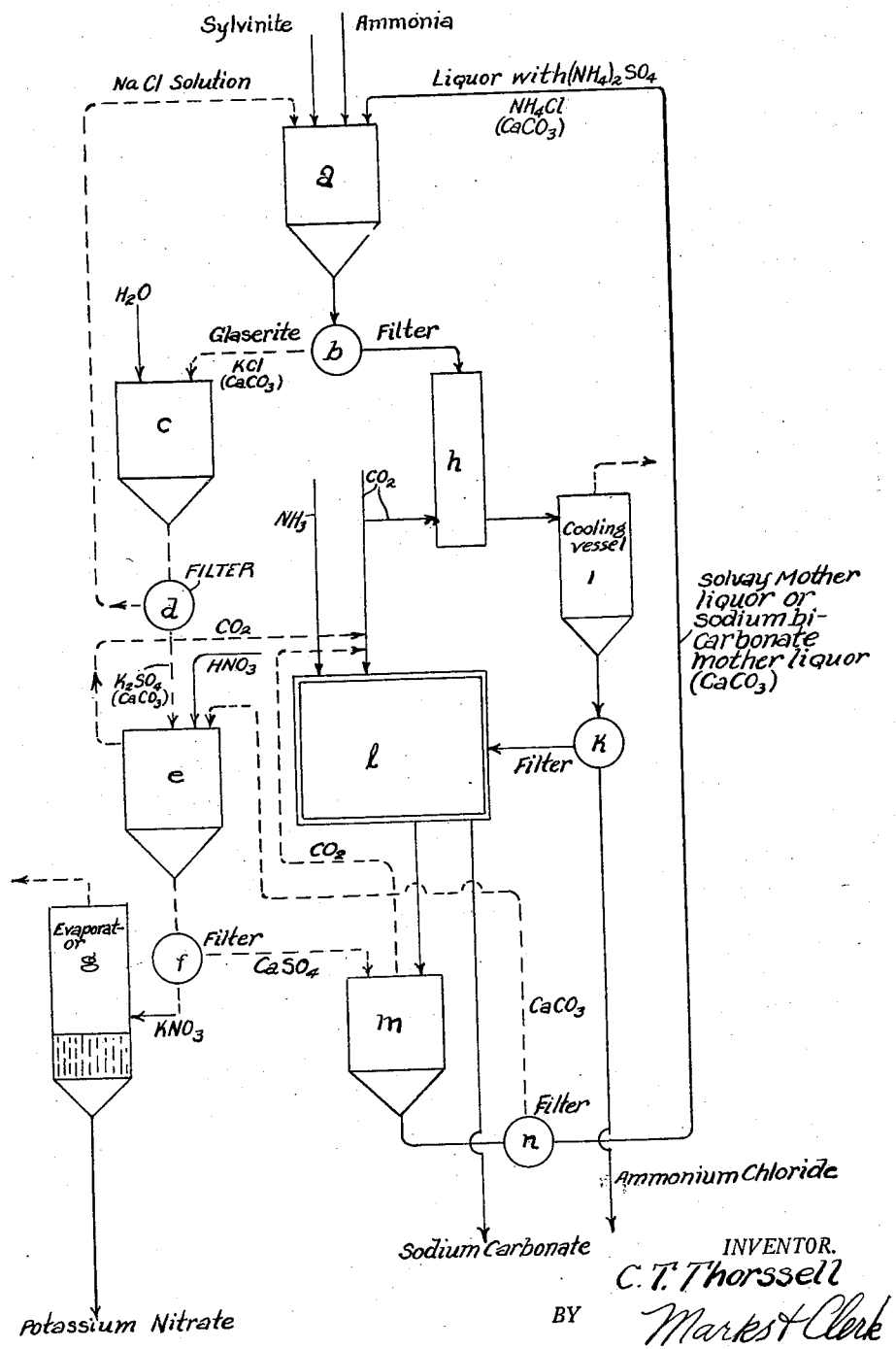
INVENTOR.
C. T. Thorssell
BY Marks+Clerk
ATTORNEYS.

UNITED STATES PATENT OFFICE

CARL THEODOR THORSSELL, OF CASSEL, GERMANY

PROCESS FOR THE PRODUCTION OF POTASSIUM NITRATE AND SODIUM CARBONATE

Application filed July 3, 1930, Serial No. 465,794, and in Germany July 13, 1929.

One known method of producing potassium nitrate is the decomposition of potassium sulphate by means of calcium nitrate:

$$K_2SO_4 + Ca(NO_3)_2 = 2KNO_3 + CaSO_4.$$

The gypsum formed is separated from the potassium nitrate solution by decantation or filtration and the potassium nitrate solution so obtained is evaporated.

This method of making potassium nitrate appears very simple and promising, but serious obstacles stand in its way.

In the first place the reaction does not proceed so simply as is to be assumed from the above equation, since not only gypsum but double compounds of potassium and calcium with sulphuric acid also are formed, such as syngenite $(K_2SO_4.CaSO_4.H_2O)$ and potassium pentacalcium sulphate $$(K_2SO_4.5CaSO_4.H_2O).$$

As a result of this there is loss of potassium which renders the process more expensive and makes it less profitable, or unprofitable.

A further obstacle is that potassium sulphate is in itself a too valuable raw material for the manufacture of potassium nitrate, more particularly if the potassium nitrate is to be used as a fertilizer.

The invention describes a process which enables the above reaction to be used for the production of potassium nitrate without the said disadvantages obtaining.

In patent application Ser. No. 431,336 a process is described by means of which potassium sulphate and sodium carbonate are made from sylvinite, in which gypsum is stirred into the soda mother-liquor and a liquor containing ammonium sulphate is obtained which is used for working up the sylvinite to potassium sulphate. During the stirring of the gypsum in the sodium bicarbonate mother-liquor calcium carbonate is obtained as a by-product which must be removed from the process.

It is provided in the second patent claim of the same application that if the potassium sulphate obtained is used for a process in which calcium sulphate is produced, the latter is introduced into the process again. In this way the sulphuric acid in the process remains in circulation so that there is no consumption of this acid.

In the present invention not only is the sulphuric acid maintained in circulation, but the calcium also, the calcium carbonate, which is otherwise thrown onto the waste heap, being led back into the process and combined again with sulphuric acid to form gypsum which serves to prepare fresh quantities of potassium sulphate for stirring into the soda mother-liquor. The process is carried out as follows:

Gypsum is stirred into the mother-liquor of an ammonia-sodium carbonate process the so-called "Solvay process", it reacts with the ammonium carbonate and ammonium bi-carbonate present in the liquor to form ammonium sulphate and calcium carbonate $$CaSO_4 + (NH_4)_2CO_3 = (NH_4)_2SO_4 + CaCO_3$$

or $$CaSO_4 + 2NH_4HCO_3 = (NH_4)_2SO_4 + CaCO_3 + CO_2 + H_2O.$$

The latter is separated off and the liquor is stirred up with sylvinite, ammonia being led in at the same time. In this way sodium potassium sulfate or "glaserite" and potassium chloride form as a precipitate which, after separation from the liquor, is treated with water whereby potassium sulphate and a solution of sodium chloride are formed $$8KCl + 2NaCl + 4(NH_4)_2SO_4 = \underset{\text{glaserite}}{3K_2SO_4.Na_2SO_4} + 2KCl + 8NH_4Cl$$

$$3K_2SO_4.Na_2SO_4 + 2KCl + 4K_2SO_4 + 2NaCl.$$

The latter goes back into the process. The liquor separated off from the glaserite, which contains chiefly sodium chloride and ammonium chloride, is cooled in order to separate out some ammonium chloride and is then suitable for the "Solvay process". After the sodium bi-carbonate formed in the "Solvay process" is separated off, the mother-liquor is again stirred up with gypsum and so on.

The calcium carbonate obtained by stirring the mother-liquor from the "Solvay process"

with gypsum is decomposed with the potassium sulphate obtained in a later stage of the process and nitric acid, whereby potassium nitrate and gypsum are formed.

$$K_2SO_4 + 2HNO_3 + CaCO_3 = CaSO_4 + 2KNO_3 + CO_2 + H_2O.$$

The potassium nitrate goes into solution, and after separation of the gypsum, is obtained by evaporation or cooling. The gypsum separated off is stirred into the mother-liquor of the above mentioned "Solvay process". That the gypsum contains double salts of potassium and calcium is of no importance in this connection, since these salts are converted during the stirring into potassium sulphate and calcium carbonate.

In this way the reaction mentioned in the introduction which is advantageous for the production of potassium nitrate (the decomposition of potassium sulphate with calcium nitrate) is made of practical utility, the obstacles hindering the same, i. e. loss of potassium in the gypsum separating out and the use of the expensive potassium sulphate as raw material being eliminated.

Sylvinite, nitric acid, carbonic acid and ammonia serve as raw materials, and potassium nitrate, sodium carbonate and ammonium chloride are obtained as products. The ammonia may also be dispensed with as a raw material, if this is desirable, through recovery of the same by expulsion from the ammonium chloride, just as is generally usual in the manufacture of soda sodium carbonate, in which case therefore only potassium nitrate and soda are obtained.

Reference is here made to the attached flow sheet:

Sylvinite (KCl+NaCl) is stirred up in vessel $a$ with a liquor consisting chiefly of $(NH_4)_2SO_4$ and $NH_4Cl$ and ammonia is introduced. Glaserite is formed which is very difficultly soluble in the ammoniacal liquid.

$$6KCl + 2NaCl + 4(NH_4)_2SO_4 = 3K_2SO_4 \cdot Na_2SO_4 + 8NH_4Cl.$$

In the solid substance, which is filtered off in the filtering apparatus $b$, there is contained in addition to glaserite that quantity of KCl which has been removed from NaCl during the formation of glaserite because the quantity of crude salt is so selected that the KCl contained therein is equivalent to the quantity of $SO_4$ in the solution.

This solid substance is stirred up with water in vessel $c$, the following reaction taking place:

$$3K_2SO_4 \cdot Na_2SO_4 + 2KCl = 4K_2SO_4 + 2NaCl.$$

Consequently, the solid substance separated in the filtering apparatus $d$ consists of $K_2SO_4$ and the solution which is returned to the process consists of NaCl.

The $K_2SO_4$, which is thereby obtained, is mixed with $CaCO_3$ that is subsequently obtained in the process and this mixture is dissolved into $HNO_3$ in vessel $e$ whereupon $KNO_3$ and $CaSO_4$ are formed.

$$K_2SO_4 + CaCO_3 + 2HNO_3 = 2KNO_3 + CaSO_4 + H_2O + CO_2.$$

The $CaSO_4$, which is formed, is filtered off in filter $f$ and the $KNO_3$ solution is led to the evaporator $g$ in order to obtain $KNO_3$ as the final product.

The solution obtained from the filtering apparatus $b$ and chiefly containing NaCl, $NH_4Cl$ and $NH_3$ is neutralized with $CO_2$ in vessel $h$ and cooled in vessel $i$ thereby precipitating $NH_4Cl$.

The second final product is $NH_4Cl$ which is filtered off in the filtering apparatus $k$.

The liquor is treated with $NH_3$ and $CO_2$ in vessel $l$ according to the ammonia-sodium-carbonate process, "Solvay process", and further worked into sodium carbonate which constitutes the third final product.

The $CaSO_4$ which is filtered off in $f$ is stirred with the final liquor in $m$ obtained by the ammonia-sodium-carbonate process, "Solvay process", whereupon $CaCO_3$ and $(NH_4)_2SO_4$ are formed.

$$CaSO_4 + 2NH_4HCO_3 = CaCO_3 + (NH_4)_2SO_4 + H_2O + CO_2.$$

The $CaCO_3$ is either separated in filter $n$ and treated per se—as described above—with $K_2SO_4$ and $HNO_3$ or it is left in the solution and mixed with the $K_2SO_4$ it then undergoes the said treatment.

The $CO_2$ which is liberated in vessels $e$ and $m$ returns to the process. Moreover, lacking $CO_2$ must be added.

Having now particularly described and ascertained the nature of my said invention and in what manner the same is to be performed, I declare that what I claim is:—

1. A process for the production of potassium nitrate and sodium carbonate, consisting in stirring sodium bicarbonate mother liquor obtained in the process with gypsum also obtained in the process, separating the calcium carbonate formed, treating the remaining liquor with crude sylvinitic potassium salt and ammonia, separating the precipitate of glaserite and potassium chloride formed from the liquor, treating the said precipitate with water to obtain potassium sulphate, treating the said potassium sulphate with calcium carbonate obtained in the process and nitric acid, thus obtaining gypsum and a solution of potassium nitrate, cooling the liquor remaining after the separation of the precipitate of glaserite and potassium chloride, to remove a portion of the ammonium chloride contained therein, subjecting the resulting liquor to the Solvay process, and stirring the mother liquor obtained thereby with the gypsum obtained in the production of potassium nitrate, as set forth.

2. A process as claimed in claim 1 and in which the greater part of the potassium nitrate is separated out in solid form from the potassium nitrate liquor by cooling, and the mother liquor is used for the dissolving of further quantities of potassium sulphate for decomposition with nitric acid and calcium carbonate.

In testimony whereof I have signed my name to this specification.,

CARL THEODOR THORSSELL.